United States Patent [19]

Sheets

[11] Patent Number: 4,969,498

[45] Date of Patent: Nov. 13, 1990

[54] TIRE BEAD BREAKER

[76] Inventor: John W. Sheets, H.C.R. Box 336, Dalhart, Tex. 79022

[21] Appl. No.: 276,656

[22] Filed: Nov. 28, 1988

Related U.S. Application Data

[63] Continuation-in-part of Ser. No. 126,928, Nov. 30, 1987, abandoned.

[51] Int. Cl.⁵ ............................................. B60C 25/06
[52] U.S. Cl. .................................................. 157/1.17
[58] Field of Search ...................... 157/1.1, 1.17, 1.26, 157/1.28, 1.2

[56] References Cited

U.S. PATENT DOCUMENTS

| | | | |
|---|---|---|---|
| 2,471,642 | 5/1949 | Moltz | 157/1.17 |
| 2,760,563 | 8/1956 | Bishman | 157/1.26 |
| 3,142,330 | 7/1964 | Nelson | 157/1.17 |
| 4,335,772 | 6/1982 | Bubik et al. | 157/1.28 |

FOREIGN PATENT DOCUMENTS 842876 7/1960 United Kingdom ............... 157/1.28

*Primary Examiner*—D. S. Meislin
*Attorney, Agent, or Firm*—Cushman, Darby & Cushman

[57] ABSTRACT

A portable tire bead breaker utilizes a common jacking apparatus to lever a curved foot member against the bead portion of a tire/rim combination. A top stabilizer keeps the curved foot member in the proper orientation and a bead engaging foot member permits the breaking of difficult to break bead on tires having soft and limber sidewalls.

10 Claims, 3 Drawing Sheets

TIRE BEAD BREAKER

This is a continuation-in-part of Application Ser. No. 07/126,928 filed Nov. 30, 1987, now abandoned

FIELD OF THE INVENTION

The present invention relates to a device for breaking tire bead portions away from the rim of a wheel. More particularly, this device is related to a portable bead breaker device which can be easily transported and used by a single operator without the aid of external power sources.

BACKGROUND OF THE INVENTION

In the tire bead breaking art, there exist many devices for accomplishing this difficult task. Notably the majority of the devices included in the prior art require an external power source either in the form of electrical, mechanical, or pneumatic power. Most tire mounting shops use a familiar pneumatic tire changing device such as that disclosed in U.S. Pat. No. 3,786,852 to Houston. The Houston device is a rather elaborate combination of levers and springs operated by a high pressure air source.

Another prior art bead breaker device is disclosed in U.S. Pat. No. 2,779,397 to Kohsiek wherein mated sleeved cylinders are strapped around a rim so as to create a cavity between the tire bead, rim, and one of the sleeved cylinders, so that the cavity may be charged with air and exert pressure so as to move the bead away from the rim. Another prior art bead breaking device is disclosed in U.S. Pat. No. 2,775,289 to Anderson. The Anderson device uses a bumper jack apparatus to urge a tire-engaging element against the sidewall of a tire and rim combination mounted on a vehicle.

U.S. Pat. No. 4,335,772 to Bubik discloses a single foot bead breaker. However this device will not break the bead of tires having soft limber sidewalls and balloon type tires mounted on small diameters.

It is also known to use a bead breaking device that has a foot portion that can be moved in both a downward and a sideways direction. U.S. Pat. No. 3,142,330 to Nelson shows a bead breaking device in which a first fluid cylinder initially moves the foot portion downward onto the tire and partially opens the bead. While still in this downward position, with the foot portion rubbing against the tire, a second hydraulic cylinder forces the foot portion sideways so that the foot cylinder is forced under the flange of the tire rim and over the bead. However, because the foot portion moves sideways while still pressing on the tire, the soft and limber tire sidewalls can be easily damaged.

Each of the above-discussed prior art bead breaking devices requires some form of external power or, at the very least in the case of Anderson, is inconveniently used on a tire and rim combination securely mounted on a vehicle. Furthermore, these devices are not suited to break beads on tires with soft, limber sidewalls.

The present invention seeks to eliminate the external power requirements of the prior art bead breaking devices, as well as to provide a convenient and portable bead breaking device that can easily break bead of tires having soft limber sidewalls.

SUMMARY OF THE INVENTION

To achieve portability and convenience, the present invention has as its first objective a simplicity of construction. The device is made from readily available steel tubing and angles, in combination with either a hydraulic or other compact jack.

To break the beads on tires having a soft limber sidewalls, the bead breaking apparatus of the present invention uses a two separately moveable foot pieces.

Also, to make sure that the alignment of the foot pieces and the tire is correct, a stabilizer bar is utilized.

A tire breaking apparatus according to the present invention comprises a base assembly with an upright support and jack located on a top surface thereof. The upright support and jack are both pivotally connected to an extended lever arm, with the upright support positioned towards a mid-portion of the level arm, and the jack connected to one end thereof.

On the other end of the lever arm a tire engaging foot-piece and support are attached so that when the jack is extended, the lever arm pivots so as to urge the tire engaging foot-piece downwardly against the bead portion of a tire. A top stabilizer bar is also pivotally mounted at one end to the upright support member above the lever arm. This stabilizer bar ensures that the downwardly direction that the foot piece moves is straight down to prevent slippage of the foot piece from the tire.

Furthermore, a bead engaging footpiece cooperates with the tire engaging foot piece so that once the downward motion of the tire engaging foot piece begins, the bead engaging footpiece can be inserted under the flange of the tire rim and over the bead of the tire. Once the bead engaging foot piece is inserted, both foot pieces cooperatively move downward to break the bead of the tire.

Other objects, features, and characteristics of the present invention, as well as the methods in operation and functions of the related elements of the structure and the combination of parts and economies of manufacture, will become apparent upon consideration of the following description and the appended claims with reference to the accompanying drawings, all of which form a part of this specification, wherein like-referenced numeral designate corresponding parts in the various figures.

DETAILED DESCRIPTION OF THE PREFERRED EMBODIMENT

Figure 1:
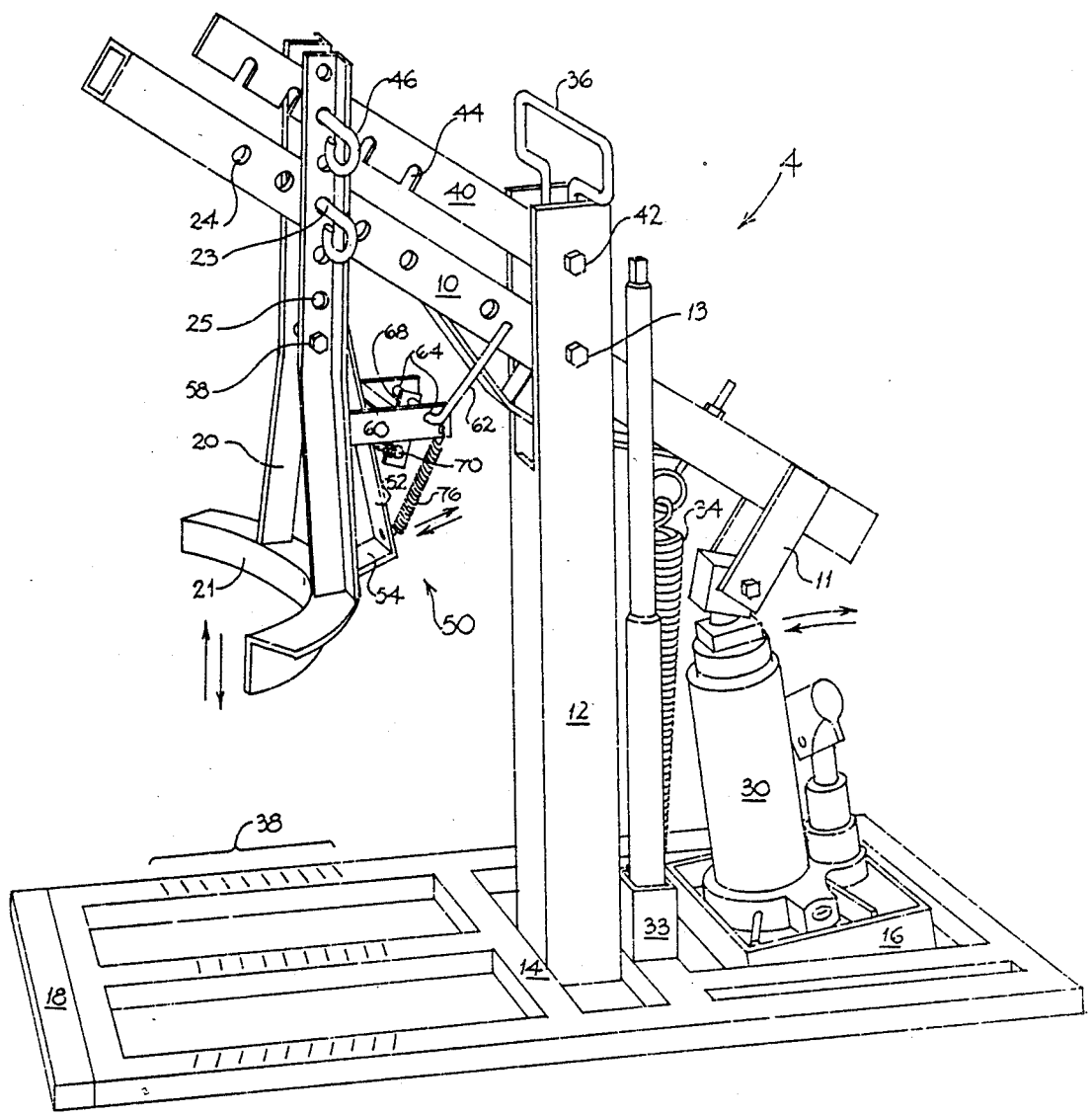
FIG. 1 is a perspective view of a tire bead breaking apparatus according to the present invention.

The following description of the tire bead breaker is made with reference to drawing FIGURE 1. The bead breaker apparatus is generally designated as 4. The major components of the bead breaker comprise a base assembly 14, an upright support element 12, a lever arm 10, bead breaker arm 20, foot piece 21, jack 30, top stabilizer bar 40, and bead engaging foot piece 50.

Figure 2:
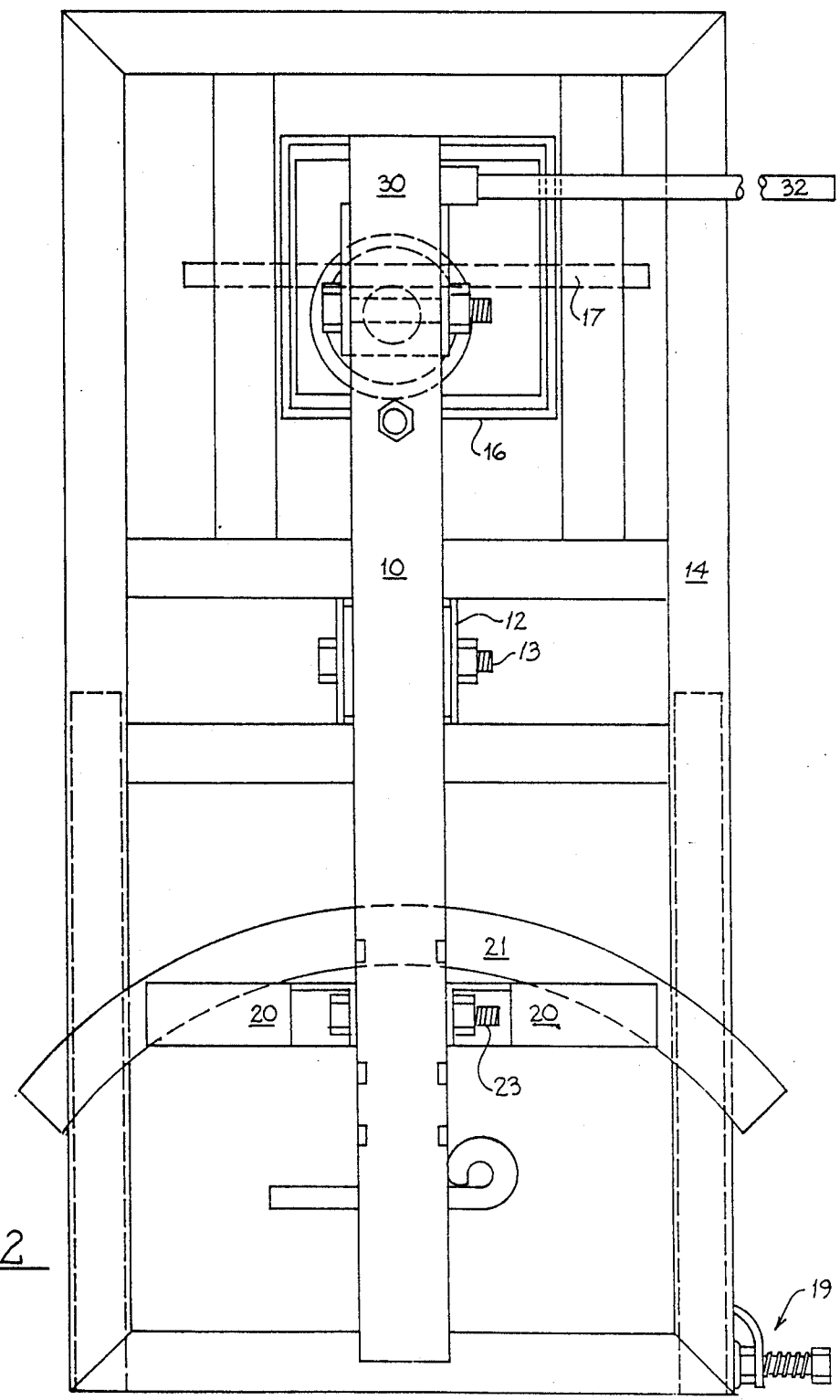
FIG. 2 is plan view of a tire bead breaking apparatus according to the present invention without the top stabilizer bar and the and the bead engaging foot piece.

Base assembly 14 may comprise any convenient configuration of tubing members, or even a stamped steel member which is capable of accommodating and supporting the upright member 12 and the pivoting jack support 16. In this embodiment, the base assembly is a generally elongated rectangularly-shaped configuration of squared tubing members. On the portion of the base member on which a tire sidewall would rest, there are raised weld beads 38 located for enhancing the friction between the tire sidewall and the base member. Additionally, a base extender element 18 is shown which telescopically (as shown in FIG. 2) fits within the longitudinal outer elements of the base member 14 and effectively extends the length of the base member so as to enhance its stability.

Along a mid-portion of the base 14, the upright support member 12 is fixedly attached. This upright member 12 may be either welded, bolted, or otherwise rigidly attached to base 14. The support member 12 can be made from any appropriately sized longitudinal member, providing that an upper end thereof can accommodate a pivot so as to pivotally support the lever arm 10.

The portion of the base member, which is located opposite the end portion with the weld beads 38 located thereon, accommodates jack support 16. The jack support 16 comprises a generally cup-shaped member which is pivotally attached to the surrounding elements of base assembly 14. (The pivotal support pin 17 is shown in FIG. 2.)

Resting in the jack support element 16 is jack 30. Jack 30 is any appropriately sized hydraulic or mechanical jack of a fairly compact and light weight configuration. In the present embodiment, the jack comprises a 4-ton hydraulic jack. The extension element of the hydraulic jack is pivotally connected to jack engaging element 11. The jack engaging element 11 is then rigidly attached to one end of lever arm 10. Since the jack is pivotally supported at both ends, jack 30 may rock back and forth, as shown, depending on its state of extension.

Lever arm 10 is pivotally supported along a mid-portion thereof by lever arm pivot pin 13. This pivot pin 13 may be in the form of a bolt (as shown) or a conveniently removably cotter pinned pin element. On the end of the lever arm opposite the end which is connected to the jack, there are several bead breaker support holes 24 located therein. The bead breaker support holes accommodate pin 23 which pivotally connects lever arm 10 to bead breaker arm 20 through one of holes 25. Each of the lever and breaker arms have a plurality of holes located therein to provide for mutual adjustment between the arms and thereby accommodate a wide range of tire and wheel rim sizes.

Bead breaker arm 20 in turn is rigidly connected to curved foot piece 21. Foot piece 21 may be of any appropriate configuration to engage the sidewall of a tire. In this embodiment it is shown as a partial circle which is suitable for larger tires, i.e., passenger car tires. However, in the case of small tires, i.e., ATV motorcycle tires, a foot piece in the shape of a full circle may even be used.

Top stabilizer bar 40 is pivotally connected at one end to upright support member with pivot pin 42. Notches 44 in top stabilizer bar 40 are spaced at the same interval as the holes 24 in lever arm 10. Stabilizer pin 46 is insertable into one of holes 25 above lever arm 10 so that top stabilizer bar 40 and lever arm 10 are parallel. In the embodiment shown in FIG. 1, this parallel configuration is reached when pin 46 is placed two holes above pin 23.

Figure 3:
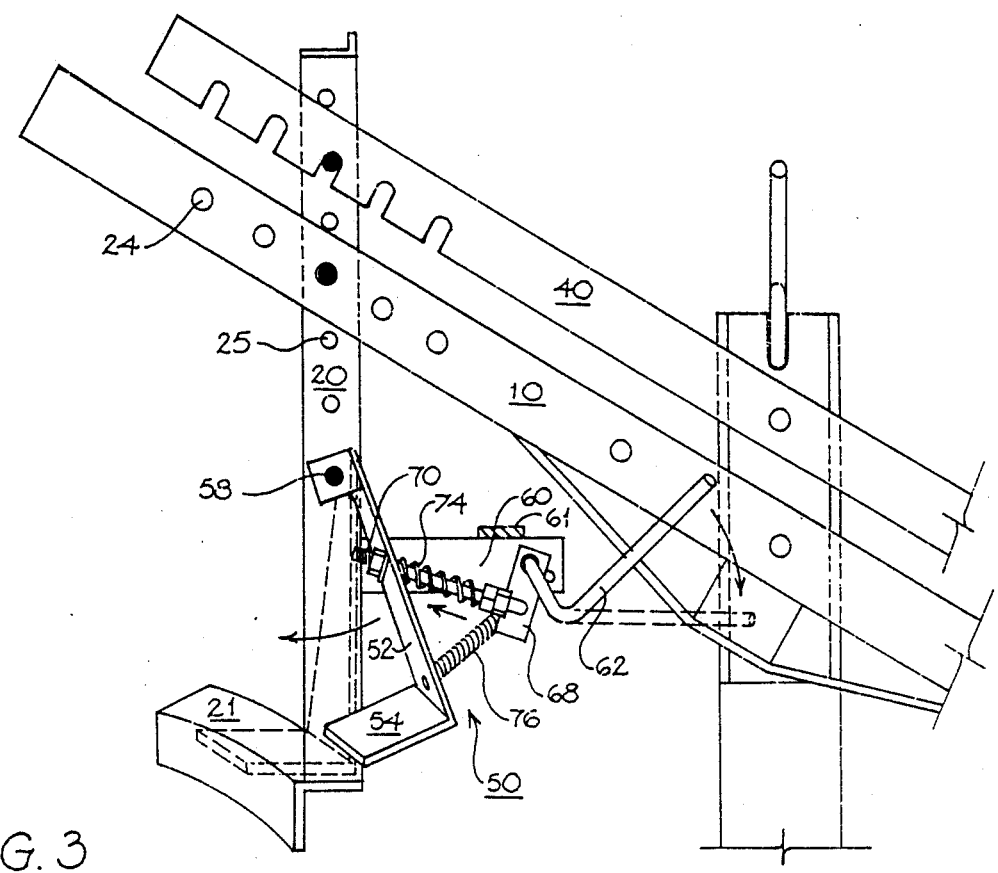
FIG. 3 is a side section view of the bead engaging foot piece with the front portion of support 60 and top cross plate of that support removed for illustration purposes, and with a portion of bead engaging member 52 likewise removed for simplicity.
Figure 4:
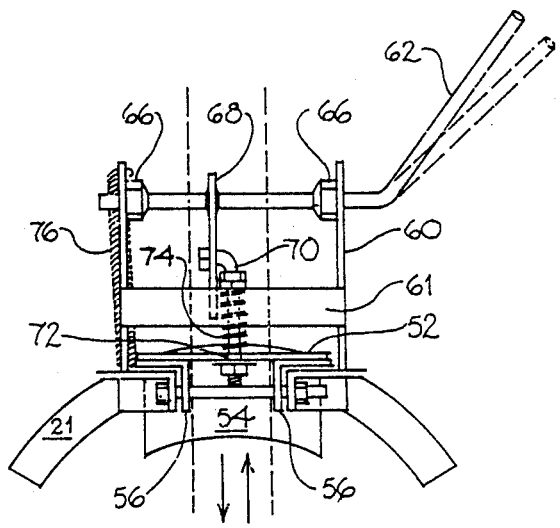
FIG. 4 is a top view of the bead engaging foot piece.

Also shown in FIG. 1, and shown in more detail in FIGS. 3 and 4, is the construction of bead engaging foot piece 50. Bead engaging foot piece 50 includes bead engaging member 52 containing a bead engaging end 54, which is bent at substantially 90° to form an L shape. Bead engaging member 52 can be formed from a single piece, or multiple pieces of welded material. The top end of bead engaging member 52 is pivotally connected to the bead breaker arm 20.

Welded to bead breaker arm 20 is an H shaped lock mechanism support 60. Support 60 supports the locking mechanism of bead engaging foot piece 50, described hereinafter. Although the shape of support 60 can be different, this shape effectively cooperates with the locking mechanism.

The locking mechanism includes rotatable handle 62 that fits through holes 64 in support 60 and is kept in place using bolts 66 shown in FIG. 4. Welded to the center portion of handle 62, between the two parallel members of stabilizer 60, is arm 68. Attached to arm 68 is one end of pivotable rod 70. Rod 70 is attached at the other end through a hole 72 in bead engaging member 52 and has a bolt attached at its end. Compression spring 74 fits through rod 70 between arm 68 and bead engaging member 52. Furthermore, point spring 76 is attached between the lower portion of bead engaging member 52 and support 60.

Other features shown in FIG. 1 which add to the convenience and portability of the present tire bead breaker are handle element 36, jack handle support 33, and return spring 34. Handle 36 provides a convenient location for an operator to grip and carry the tire bead breaker device to a desired work location. The jack handle holder 33 provides a convenient method of storage for the jack handle associated with the jack 30. Finally, return spring 34 aids in the retraction of a hydraulic-type jack used in the present invention. Of course, if a similarly compact mechanical jack, i.e., a scissors other or screw actuated jack, were used, the return spring 34 would no longer be necessary.

FIG. 2 shows a partial plan view of a tire bead breaker according to the present invention. Jack handle 32 is shown engaged with hydraulic jack 30. Also, the pivotal connection between jack support member 16 and base assembly 14 is shown via jack pivot pin 17. Also shown is a frictional locking element 19 for holding base extension member 18 in an extended position. The frictional locking element comprises a holder and bolt combination which enables the bolt to urge against the telescopic portion of base extender 18 as it slides within the side longitudinal elements of base assembly 14.

In operation, the tire bead breaker works as follows. A tire/rim combination is placed flat on top of the base assembly 14 so that weld beads 38 can frictionally engage the downwardly facing sidewall of the tire. The bead breaker arm is then positioned along lever arm 10 so as to position curved foot piece 21 approximately 2 inches above the upwardly facing tire bead portion. When the bead breaker arm is pinned in place by breaker pivot pin 23, jack 30 is extended so as to pivot lever arm 10 around lever pivot pin 13. As lever arm 10 pivots about pivot pin 13, the curved foot piece 21 is urged against the tire bead portion and pushes it downwardly towards the top surface of base assembly 14. The stabilizer 40 ensures that curved foot piece 21 maintains its proper orientation and travels downward in a substantially straight direction so as not to slip from the tire. In this manner, the respective opposite sidewalls of a tire are urged towards each other and away from their respective rim bead areas.

Once the sidewalls have been slightly urged by curved foot piece 21, but before the bead has been broken, handle 62 is rotated to cause arm 68 to rotate and compression spring 74 to compress. As compression spring 74 becomes further compressed, it causes rotation of bead engaging member 52 about pivot pin 58 and bead engaging end 54 to pass under the flange of the tire rim and over the bead, the rotation of the bead engaging member 52 causing the bead engaging end 54 to pass over foot piece 21 and over the foot piece 21 as shown in FIG. 3. During this movement, compression spring 74, acts similar to a shock absorber and cushions the entry of bead engaging end 54 over the tire bead. The above operation utilizing the bead engaging foot piece 50 is especially useful in breaking the bead of soft wall tires or tires with secondary safety beads such as those designed for ATVs.

Handle 62 will only rotate until arm 68 rotates into and strikes the top plate of support 60 as shown in FIG. 4. Arm 68 is then retained in position because the tension from compression spring 74 is pushing arm 68 into the top cross plate 61 of support 60 since arm 68 has moved over a dead center position.

When the bead is broken, handle 62 is pulled upward and point spring 76 pulls bead engaging member 52 back to an outward position. Then, jack 30 is deactivated and retraction spring 34 retracts hydraulic jack 30 to a non-extended position.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tire bead breaker apparatus, comprising:
    first foot piece means for pushing against the bead portion of a tire;
    lever means for urging said first foot piece means against said bead portion, said lever means having first and second ends and a mid-portion;
    foot piece support means pivotally connecting said first foot piece means to said lever means between said first end thereof and said mid-portion;
    upright support means for pivotally supporting said lever means at a pivot point on said mid-portion of said lever means;
    stabilizer means for pivotally supporting said foot piece support means so that said first foot piece means pushes against the bead portion of said tire in a substantially straight vertically downward direction, said stabilizer means comprising a straight element having one end pivotally attached to said upright support means above said lever means and having means for adjustable and pivotal attachment to said foot piece support means directly vertically above said pivotal connection of said foot piece support means and said lever means;
    second foot piece means pivotally connected to said foot piece support means between said first foot piece means and the pivotal connection of said foot piece support means to said lever means, said second foot piece means being insertable under a flange portion of a tire rim without engaging the tire sidewall;
    base means having top and bottom surfaces for supporting said upright support means on said top surface, and;
    jack means for moving said second end of said lever means, said jack means being supported on said top surface of said base means.

2. A tire bead breaker apparatus as in claim 1, wherein:
    said foot piece means comprises a first curved angle element.

3. A tire bead breaker apparatus as in claim 2, wherein:
    said lever means comprises a first longitudinal tube element.

4. A tire bead breaker apparatus as in claim 3, wherein:
    said foot piece support means comprises a pair of curved angle elements which are welded to said first curved angle element and which are pivotally connected to said first longitudinal tube element.

5. A tire bead breaker apparatus as in claim 4, wherein:
    said upright support means comprises a second longitudinal tube element having first and second ends, said first end being pivotally connected to said first longitudinal tube element, said second end being welded to said base means.

6. A tire bead breaker apparatus as in claim 5, wherein:
    said jack means is hydraulic.

7. A tire bead breaker apparatus as in claim 5, wherein:
    said jack means is mechanical.

8. A tire bead breaker apparatus as in claim 1 wherein said stabilizer means comprises a straight element having one end pivotally attached to said upright support means above said lever means and adjustably and pivotally connected to said foot piece support means above said pivotal connection at said first foot piece support means and said lever means.

9. A tire bead breaker apparatus as in claim 1 wherein said second foot piece means includes a bead engaging member having a bead engaging end insertable under said tire rim flange and a retaining mechanism, said retaining mechanism being supported by said foot support means for movement relative to said first foot piece means to move said second foot piece means under said tire rim flange.

10. A tire bead breaker apparatus as in claim 9 wherein said retaining mechanism includes:
    a handle that is rotatable on a support structure, said support structure attached to said first foot piece support means;
    an arm attached to said rotatable handle;
    a bolt attached at one end to said arm and passes through said bead engaging member; and
    a compression spring disposed over said bolt between said arm and said bead engaging member.

* * * * *